Figure 1:
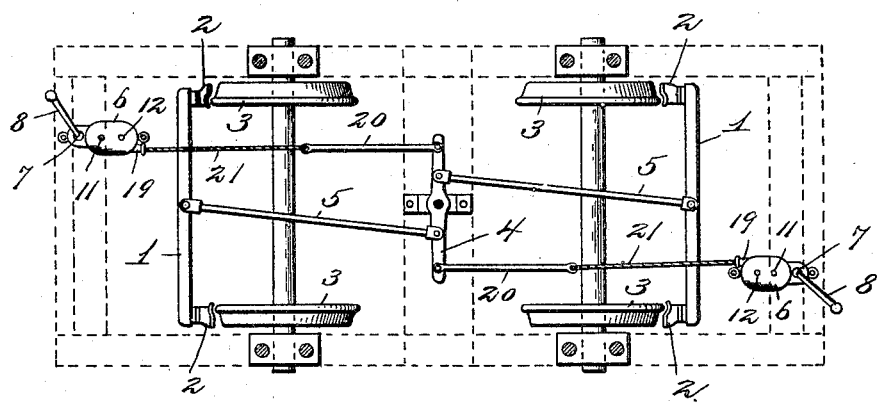

No. 696,530. Patented Apr. 1, 1902.
W. WINKLER.
BRAKE MECHANISM FOR VEHICLES.
(Application filed Nov. 30, 1901.)
(No Model.)

Witnesses
Harry L. Amer.
Chas. S. Hyer.

Inventor
William Winkler.
By Victor J. Evans,
Attorney

UNITED STATES PATENT OFFICE.

WILLIAM WINKLER, OF SYRACUSE, NEW YORK, ASSIGNOR, BY DIRECT AND MESNE ASSIGNMENTS, TO GEORGE D. GALPHIN AND FRANK H. BROWN, OF SYRACUSE, NEW YORK, AND EDSON D. SCOFIELD, OF NEW YORK, N. Y.

BRAKE MECHANISM FOR VEHICLES.

SPECIFICATION forming part of Letters Patent No. 696,530, dated April 1, 1902.

Application filed November 30, 1901. Serial No. 84,239. (No model.)

*To all whom it may concern:*

Be it known that I, WILLIAM WINKLER, a citizen of the United States, residing at Syracuse, in the county of Onondaga and State of New York, have invented new and useful Improvements in Brake Mechanism for Vehicles, of which the following is a specification.

This invention relates to brake mechanism for vehicles adapted for general application, but particularly effective in connection with cars operatively under the control of a motorman.

Many disadvantages are resident in brake mechanism as now commonly constructed and used, such as liability of the chains to break, impositive actuation of the brake-bar and shoes carried thereby, owing to the normal slack in the operating-chains, and the failure to maintain a braking pressure of such force as to check the movement of a car within a short distance, and a consequent failure to avert accidents. Furthermore, in brake mechanisms as heretofore arranged it has been necessary to rotate the initial power-receiving brake post or spindle a number of times before the brake-chain will be drawn taut and to apply considerable power to the said brake post or spindle in order to obtain a sufficient braking force on the wheels of a car to effect a stop, with the material disadvantage that the car would be permitted to run or move a considerable distance before the applied braking force would become strong enough to cause cessation of movement, this lapse of time being due to the slackness of the chains connecting the brake post or spindle with the mechanism controlling the movement of the brake-shoes.

The improved brake mechanism has been devised to effect a quick stoppage of a car within a comparatively short distance by a minimum amount of force applied by the motorman or other operator to the brake post or spindle, and to attain this end the pull cable, chain, or similar device is normally taut and engages a series of compensating devices proportionately constructed and applied with intermeshing gears, a part of the said compensating devices being directly operative by the brake post or spindle and which carries the winding device for the pull cable, chain, or other analogous element. The improved mechanism has also been constructed in such manner as to set up an almost instantaneous application of the brake-shoes to wheels and is timed so that the synchronous movement of the several parts or elements directly controlled by the operation of the brake post or spindle will be commensurate and proportionate to the degree of gravitating movement of the brake-shoes relatively to the wheels or the normal gravitating distance said shoes occupy away from the wheels when the brake is loose and which is about one inch in ordinary brake mechanisms. The leverage of the operating elements or devices directly controlled by the brake post or spindle has therefore been increased to such an excessive degree in relation to the actual power required to actuate the brake-shoes and institute a forceful and effective braking pressure thereon that a very small amount of applied force to the brake post or spindle is required to suddenly and practically bring the brake-shoes in contact with the wheels and maintain them in such engagement at all times.

Figure 2:
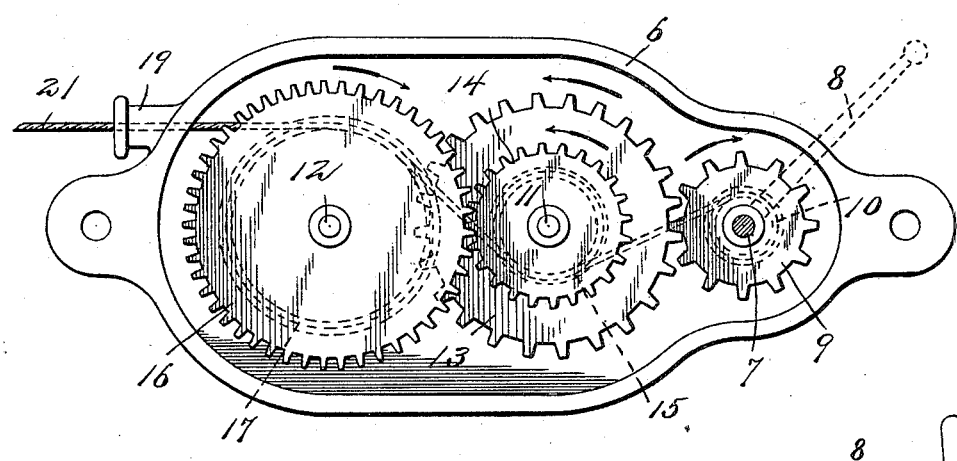
Figure 3:
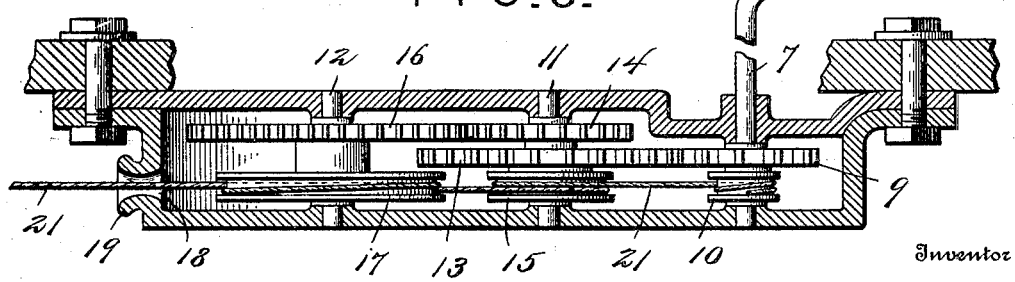

In the drawings, Figure 1 is a top plan view of brake mechanism embodying the features of the invention. Fig. 2 is a top plan view of a portion of the improved mechanism. Fig. 3 is a longitudinal vertical section through the device shown by Fig. 2.

Similar numerals of reference are employed to indicate corresponding parts in the several views.

The braking mechanism organization includes brake-beams 1, arranged adjacent opposite ends of a car and provided with brake-shoes 2 for engaging the peripheral faces or treads of wheels 3. At a point intermediate of the wheels and brake-beams a lever 4 is mounted and centrally fulcrumed to the frame of a car-truck or to an adjacent part of the bed structure of a car. On opposite sides of the central fulcrum-point of the lever 4 the inner ends of link-rods or analogous elements 5 are movably attached and extend outwardly to the centers of the brake-beams 1, where they are also terminally pivoted. The essential features of the improved brake mechanism are located at the opposite ends of the car-body, preferably under the platforms, for convenience in actuation by a motorman or the like and are contained within suitable casings 6. The initial actuating mechanism contained within the said casings 6 at opposite ends of the car are exact duplicates in construction, and only one will be specifically described. The casing 6 is bolted or otherwise secured to the bed of a car under the platform and adjacent to the plane of the dashboard, as usual in brake applications, and rising from the forward end of the casing is a brake post or spindle 7, having an upper crank-handle 8 or other suitable actuating device, which may be either integral with or detachable from the said post or spindle, as will be readily understood by those skilled in the art of car-brake mechanism. The brake post or spindle 7 extends downwardly through the upper and lower portions of the casing and serves as the primal actuating medium for the improved brake mechanism, and fastened thereon are a spur or analogous gear 9 and a winding-drum 10. Within the casing 6 are vertically-disposed spindles 11 and 12, which terminally bear in the upper and lower sides of said casing, and on the spindle 11 is a spur or analogous gear 13, which continually meshes with the gear 9 on the brake post or spindle 7, and above the said gear 13 is a pinion 14, also fast to the spindle 11. Below the gear 13 a drum 15 is secured to the spindle 11, and said latter drum is of greater diameter than the drum 10. The pinion 14 is held in continuous mesh with a spur-gear 16, fast on the spindle 12, and below said gear 16 a drum 17 is also secured to the said spindle 12, the drum 17 being proportionately larger than the drum 15. All of the drums are in direct alinement and are preferably flanged to retain the pull device bearing on the same in engagement therewith, and in the rear extremity of the casing is an opening 18, surrounded by a guide-flange 19.

Secured to the opposite extremities of the lever 4 are pull-rods 20, and to the said rods are attached the inner ends of cables, chains, or analogous devices 21, which pass through the openings 18 in the casings 6 and engage the drums 17, 15, and 10. Each cable, chain, or analogous device 21 is coiled about the drum 17 and then carried diagonally across and reversely coiled about the drum 15 and again diagonally direct from the drum 15 to the reverse portion of the drum 10, to which the end is secured, the latter drum operating to wind the cable, chain, or analogous device thereon when the brake post or spindle 7 is turned to set the brakes. The cable, chain, or analogous device 21 passes once completely around the drums 17 and 15, and by arranging said cable, chain, or analogous device to coil upon and uncoil from the two drums 17 and 15 at reverse diametric portions a uniformity in slack take-up or an obstruction to the least tendency of slack in the cable, chain, or analogous device results, and the portions of the cables, chains, or analogous devices 21 between the casings 6 and the pull-rods 20 are held taut, and said pull-rods are likewise prevented from having loose movement, so that the mechanism is always in condition for instantaneous operation without lost motion. The intermediate drum 15 is mainly instrumental in maintaining a constancy in the taut condition of the cable, chain, or analogous device 21, particularly in view of the coiling and uncoiling operations of the said cable, chain, or analogous device on the intermediate drum at a point diametrically opposite the point of engagement, or the coiling and uncoiling operations of the cable, chain, or analogous device in relation to the drum 17, and this reverse disposition of the cable, chain, or analogous device in relation to the two drums 17 and 15 is also essentially important in view of the actuation of the gears engaging the brake post or spindle 7 and the spindles 11 and 12, and if the gear 9 is rotated in the direction of the arrow shown by Fig. 2 the gear 13 will be necessarily turned or rotated in the reverse direction, and the direction of movement of the said gear 13 is similarly imparted to the pinion 14, and this in turn rotates the gear 16 in a direction similar to the rotation of the gear 9. As the gears 13 and 16 and the pinion 14 are secured or fast on their respective spindles 11 and 12, the latter will be similarly moved, and likewise the drums 15 and 17, and it will be seen that as the drum 10 is operated to wind the cable, chain, or analogous device thereon the drums 15 and 17 will be rotated in such manner as to proportionately pay off the cable, chain, or analogous device to the drum 10 in setting the brakes and that the single-coil engagement of the cable, chain, or other device in relation to the drums 17 and 15 will be uniform at all times.

Another important feature of the improved mechanism is that the drum 17 directly receives the maximum strain and is of such increased diameter relatively to the drums 15 and 10 that a very limited degree of movement thereof will be necessary to forcefully apply the brake-shoes, and the leverage is gradually increased from the brake post or spindle 7 toward the said drum 17, so that a minimum amount of power only is required to be applied to the brake-post to set the spindles 11 and 12 in motion and institute through the medium of the drum 17 the force necessary to practically operate the brake-shoes and establish a reliable and positive braking pressure of the shoes on the car-wheels. The gearing engaging the brake-post 7 and spindles 11 and 12 is proportionate to the dimensions of the drums 10, 15, and 17, and said drums, as shown, are successively in the ratio of one to two, or so that a single revolution of the drum 10 will cause the drum 15 to make a half-revolution and the drum 17 a quarter-revolution, and hence a single winding or coiling of the cable, chain, or analogous device 21 on the drum 10 will result in a corresponding pay-off of a half coil or winding of said cable from the drum 15 and a proportionate pay-off of one-quarter of the coil or winding of the said cable or other similar device from the drum 17. These exact proportions, however, are not essential, or, in other words, the proportions may be varied as long as the pay-off of the cable or like device from the drums 15 and 17 is proportionate to the winding on the drum 10.

From the foregoing it will be seen that the proportions of the drums 15 and 17 relatively to the drum 10 must be such that the movement of the cable or like device from and on the drums 15 and 17 should be such as to avoid blocking or obstructing the regular movement of said cable or similar device when the brake post or spindle 7 is actuated, and thus always maintain the cable in taut condition, which is essentially necessary to attain a quick braking action of the shoe on the wheels. As in the ordinary brake mechanism, the winding operation of the drum 10 and the coiling thereon of the cable, chain, or analogous device 21 imposes an excessive tension on the latter, and when the brake post or spindle 7 is released it will be automatically rotated in the opposite direction from that in which it was actuated to set the brakes, and the drums 15 and 17 will be correspondingly reversely rotated and the brake-shoes released from the wheels. In brake mechanisms as commonly constructed the limit of gravitating movement of the brake-shoes relatively to the treads of the wheels is about one inch, and when this minimum distance and increased leverage of the improved mechanism are considered it will be at once appreciated that a very small amount of applied power is necessary to set the brakes, and the number of revolutions or the time of actuation of the brake post or spindle 7 to attain the desired result is reduced to a minimum and the car can be stopped within a short distance. The several gears are so proportioned that an increased power will be imparted to the gear 16 when the mechanism is operated to set the brakes, and in view of the increased diameter of the drum 17 the rotative movement of the brake post or spindle 7 to actuate the correlative mechanism will be minimized, and consequently the period of time required to set the brakes will be very small or reduced, and hence the car will be stopped within a comparatively short distance considered from the point that primal actuating power is applied to the brake post or spindle 7.

It will be understood that the operation of the mechanism is not dependent upon the specific form of brake post or spindle 7 shown, and the invention contemplates the introduction of any equivalent operating device. Furthermore, the essential features of the improved brake mechanism are shown applied to each end of the car in order that the brake may be operated from either car end for reasons which will be obviously apparent. In some brake constructions where only one brake-bar is used it will be unnecessary to duplicate the mechanism including the gears and drums, and one set of the latter will be sufficient to arrive at the result sought. If the pull device 21 be in the form of a chain, twisting of the links of the latter and consequent breakage when the chain is drawn taut or has increased tension exerted thereon to set the brakes will be avoided in view of the fact that the said chain will always be held taut when the brakes are released, and as a consequence a much smaller brake-chain can be utilized than is now commonly employed in brake mechanism. In some instances springs may be introduced to assist in throwing the brake bars and shoes away from the wheel-treads when the brakes are released, and as spring devices have long been used for this purpose and are well understood in the art they have not been shown.

In order to maintain the several gears in continual mesh and prevent the brake post or spindle 7 and spindles 11 and 12 from moving vertically, the said brake-post and spindles 11 and 12 are constructed with suitable hubs or enlargements to bear against the inner sides of the upper and lower portions of the casing 6, as clearly shown by Fig. 3, and as a matter of convenience in assemblage the major portion of the casing 6 is in the form of a box-like inclosure with an upper separable top portion, the latter being held in close engagement with the main portion of said casing by means of the bolts or analogous fastenings employed to secure the entire casing to the car-frame or other support.

A simple form of the invention has been shown and described to illustrate one practical combination of elements embodying the essential features, which include a winding-drum under operative control of a motorman or other person, an intermediate tension or slack-controlling drum, and a power or direct brake-pressure-controlling drum, and all the drums proportioned successively substantially in the manner set forth and having means for rotating the same in proper directions by the actuation of the initially-operated winding-drum. Therefore it will be understood that equivalent structures and elements embodying these salient features will be considered fully within the scope of the invention, and changes in the form, proportions, dimensions, and minor details may be resorted to without departing from the spirit of the invention.

Having thus described the invention, what is claimed as new is—

1. A brake-operating mechanism comprising a series of three rotatable elements successively increasing in diameter, the one serving as a primal winding and unwinding medium, another as an intermediate tension-controller and the third largest one as the medium for directly and forcefully applying the braking power, a pull device engaging the said elements, and means in connection with all the elements for synchronously operating the same in proper-timed relation.

2. A brake-operating mechanism comprising an initially-actuating drum, a larger intermediate drum, and a power-applying drum greater in diameter than the other drums, the said drums being disposed in alinement, means for causing a synchronous operation of the drums in timed relation and proper direction of rotation, and a pull device engaging the said drums.

3. A brake mechanism comprising a brake-beam with shoes, means for directly moving the said brake-beam, a series of successively-arranged rotatable elements gradually increasing in diameter and having means for synchronously and properly rotating the same, and a pull device connected to the means for directly moving the brake-beam and engaging the said elements, said pull device being held normally taut.

4. A brake-operating mechanism comprising a series of rotatable elements successively increasing in diameter, means for operatively connecting the said elements whereby the actuation of one will synchronously rotate the others and impart to the latter a proper direction of movement, and a pull device engaging all of the said elements.

5. A brake-operating mechanism comprising a series of rotatable elements successively increasing in diameter, means for operatively connecting the said elements whereby the actuation of one will synchronously rotate the others and impart to the latter a proper direction of movement, and a pull device engaging all of said elements and adapted to be wound on and unwound from the initially-actuated element and to be normally coiled once around the remaining elements.

6. A brake-operating mechanism comprising a series of rotatable elements successively increasing in diameter, means for operatively connecting the said elements whereby the actuation of one will synchronously rotate the others and impart to the latter a proper direction of movement, the said elements having a reverse direction of rotation in alternation, and a pull device engaging all of the said elements.

7. A brake-operating mechanism comprising a series of rotatable elements successively increasing in diameter, means for operatively connecting the said elements whereby the actuation of one will synchronously rotate the others and impart to the latter a proper direction of movement, the said elements having a reverse direction of rotation in alternation, and a pull device engaging all of said elements and adapted to be wound on and unwound from the initially-actuated element and to be normally coiled around the remaining elements and to move on and off from diametrically opposite portions of said remaining elements.

In testimony whereof I affix my signature in presence of two witnesses.

WILLIAM WINKLER.

Witnesses:
W. R. CHAMBERLIN,
WM. B. FULLER.